United States Patent [19]

Huey

[11] 3,996,704
[45] Dec. 14, 1976

[54] BIKE STORAGE DEVICE
[75] Inventor: Byron C. Huey, Hemet, Calif.
[73] Assignee: The Raymond Lee Organization, Inc., New York, N.Y.; a part interest
[22] Filed: Sept. 19, 1975
[21] Appl. No.: 614,894
[52] U.S. Cl. .................................. 52/64; 52/86; 52/206; 52/234
[51] Int. Cl.² .................................. E04B 1/346
[58] Field of Search ............... 52/79, 66, 64, 174, 52/206, 27, 234, 238, 69, 86, 237; 211/17, 18, 20, 22

[56] References Cited
UNITED STATES PATENTS

| | | | |
|---|---|---|---|
| 3,543,455 | 12/1970 | Walsh | 52/237 X |
| 3,861,092 | 1/1975 | Dale et al. | 52/66 |

FOREIGN PATENTS OR APPLICATIONS

| | | | |
|---|---|---|---|
| 618,850 | 3/1927 | France | 52/27 |
| 863,653 | 3/1961 | United Kingdom | 52/69 |

Primary Examiner—Price C. Faw, Jr.
Assistant Examiner—Carl D. Friedman
Attorney, Agent, or Firm—Daniel Jay Tick

[57] ABSTRACT

A structure of lightweight plastic material has a plurality of doors. Each of the doors is selectively openable, closable and lockable. A plurality of movably mounted partitions are provided in the structure for dividing the structure into a plurality of compartments. The structure is affixed to a supporting surface. A plurality of rails are provided in the structure in spaced parallel relation on the floor of the structure. Each of the rails is movably mounted at one end, so that it is selectively adjustable in inclination with the floor. Each of the rails accommodates a bike.

3 Claims, 4 Drawing Figures

BIKE STORAGE DEVICE

DESCRIPTION OF THE INVENTION

The present invention relates to a bike storage device. More particularly, the invention relates to a bike storage device for removably storing a plurality of bikes.

Objects of the invention are to provide a bike storage device of simple structure, which is inexpensive in manufacture, which functions efficiently, effectively and reliably to safely and securely shelter and store a plurality of bikes such as, for example, bicycles, motorcycles, and the like.

In order that the invention may be readily carried into effect, it will now be described with reference to the accompanying drawing, wherein.

In the FIGS., the same components are identified by the same reference numerals.

The bike storage device of the invention is for removably storing a plurality of bikes such as, for example, bicycles, motorcycles, and so on.

Figure 1:
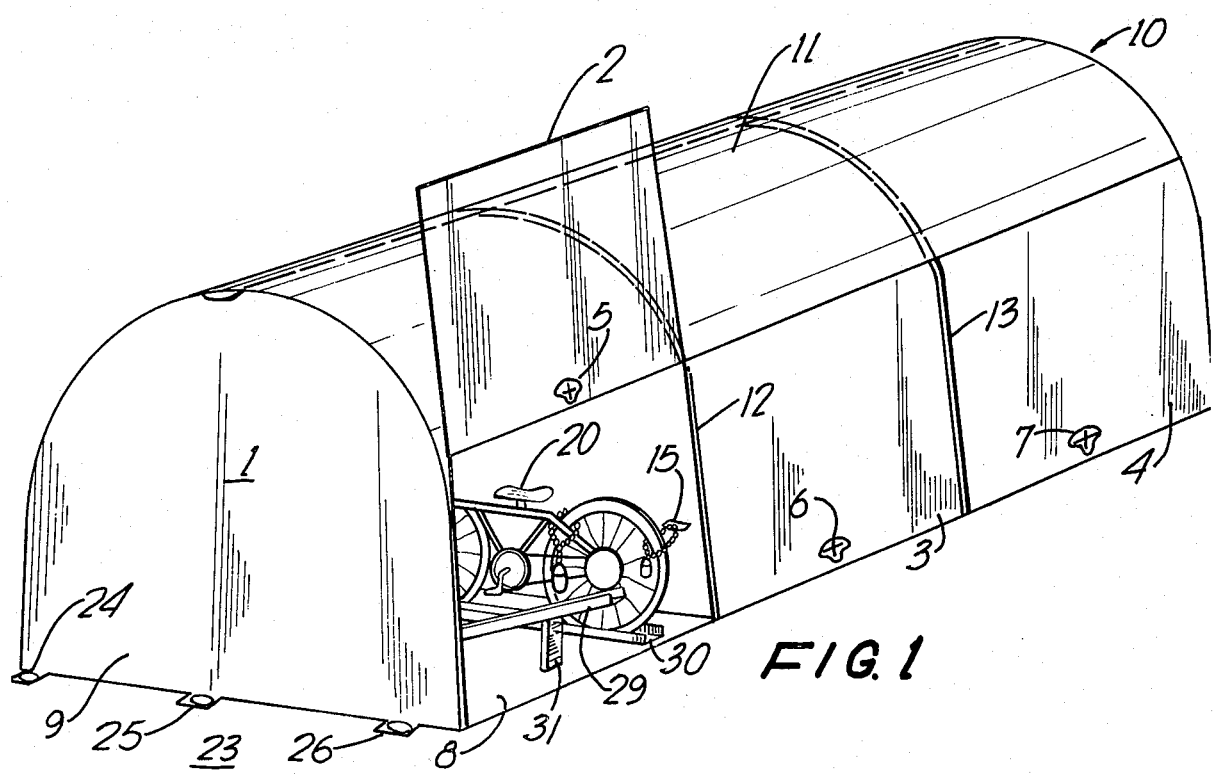
FIG. 1 is a perspective view of an embodiment of the bike storage device of the invention.
Figure 2:
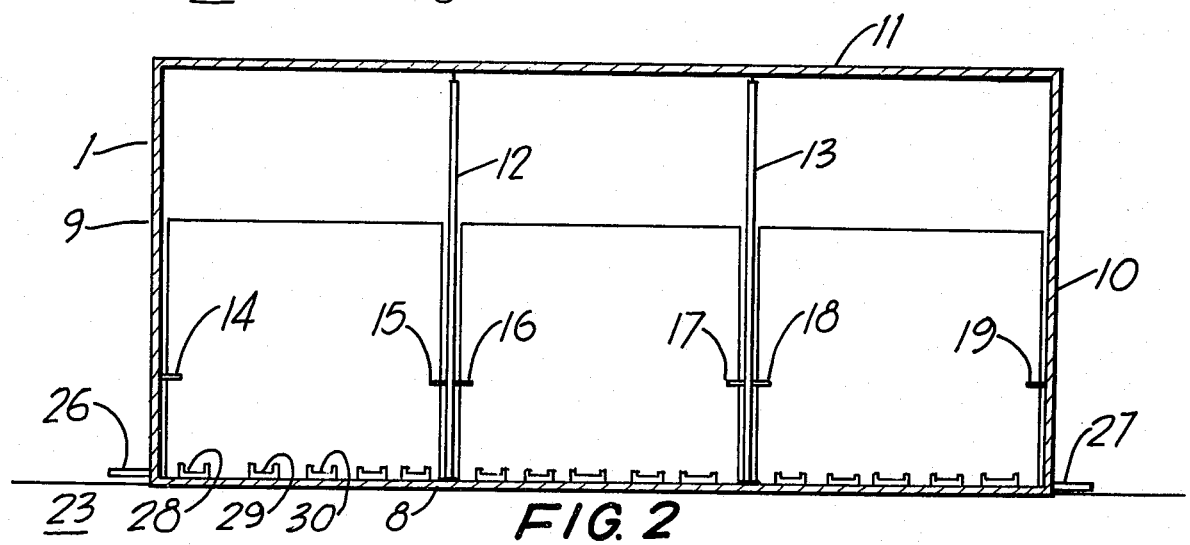
FIG. 2 is a cross-sectional view of the embodiment of FIG. 1.

The bike storage device of the invention comprises a structure 1 (FIGS. 1 and 2) of lightweight plastic material, of any suitable type, having a plurality of doors 2, 3 and 4 (FIG. 1). Each of the doors 2, 3 and 4 is selectively openable, closable and lockable via a key-operated locking handle 5, 6 and 7, respectively (FIG. 1). The structure 1 has a floor 8 (FIGS. 1 and 2). The structure 1 also has walls 9 and 10 and a roof 11.

A plurality of movably mounted partitions 12 and 13 (FIGS. 1 and 2) and any additional partitions desired, are provided in the structure 1 for dividing the structure into a plurality of compartments. Securing devices 14, 15, 16, 17, 18 and 19, of any suitable type, such as, for example, ring bolts, or the like, are provided on the walls and partitions for releasably securing bikes such as, for example, a bicycle 20 (FIG. 1) thereto, as shown in FIG. 1.

Figure 3:
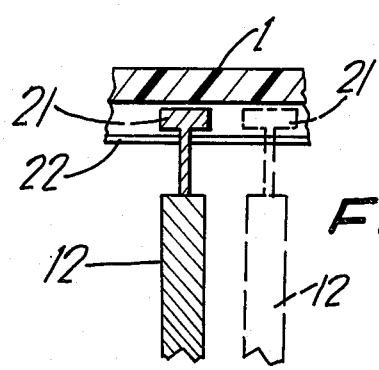
FIG. 3 is a sectional view, on an enlarged scale, illustrating the mounting of a partition in the structure of the bike storage device of the invention.

The partitions 12 and 13 are movably mounted by any suitable means such as, for example, overhead channels or tracks mounted on the underside of the roof 11 and projections extending from the tops of the partitions and mounted and guided in the channels. Thus, as shown in FIG. 3, the partition 12 has a projection 21 extending from the top thereof and mounted and guided in a channel 22.

The structure 1 is affixed to a supporting surface 23 by any suitable fastening devices 24, 25, 26, 27, and so on (FIGS. 1 and 2), such as, for example, ring bolts, or the like.

A plurality of rails 28, 29, 30, and so on (FIGS. 1 and 2), are provided in the structure in spaced substantially parallel relation on the floor 8 of the structure. Each of the rails 28, 29, 30, and so on, is movably mounted at one end, so that it is selectively adjustable in inclination with the floor 8. Each of the rails 28, 29, 30, and so on, accommodates a bike.

Each of the rails comprises a substantially U-shaped cross-sectioned beam pivotally affixed to the floor 8 of the structure 1 at one end and support means such as, for example, a strut 31, as shown in FIG. 1, for the rail 29, for supporting the other end of the rail at a selected height above the floor. This avoids entanglement of next-adjacent bikes.

Figure 4:
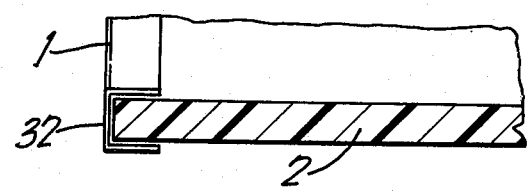
FIG. 4 is a view, partly in section, on an enlarged scale, illustrating the mounting of a door in the structure of the bike storage device of the invention.

The doors may be hung in any suitable manner such as, for example, in tracks such as, for example, a track 32, as shown in FIG. 4, for slidable movement up and down.

While the invention has been described by means of a specific example and in a specific embodiment, I do not wish to be limited thereto, for obvious modifications will occur to those skilled in the art without departing from the spirit and scope of the invention.

I claim:

1. A bike storage device for removably storing a plurality of bikes, said bike storage device comprising
a linearly extending structure of lightweight plastic material having a plurality of doors, each selectively openable, closable and lockable, said structure having a floor;
a plurality of movably mounted partitions in the structure movable in directions of length of the structure for dividing the structure into a plurality of compartments;
fastening means for affixing the structure to a supporting surface; and
a plurality of rails in the structure in spaced substantially parallel relation on the floor of the structure, each of the rails being movably mounted on the floor at one end so that it is selectively adjustable in inclination with the floor, and each of the rails accommodating a bike.

2. A bike storage device as claimed in claim 1, wherein the structure has walls, and further comprising securing means on the walls and partitions for releasably securing bikes thereto.

3. A bike storage device as claimed in claim 1, wherein each of the rails comprises a substantially U-shaped cross-sectioned beam pivotally affixed to the floor of the structure at one end and support means for supporting the other end of the rail at a selected height above the floor to avoid entanglement of next-adjacent bikes.

* * * * *